United States Patent [19]

Wada et al.

[11] Patent Number: 5,274,078

[45] Date of Patent: Dec. 28, 1993

[54] PROCESS FOR PRODUCING COLLAGEN POWDER

[75] Inventors: Tetsuo Wada; Tetsuhiko Yamaguchi, both of Kawasaki, Japan

[73] Assignee: Showa Denko K.K., Tokyo, Japan

[21] Appl. No.: 729,308

[22] Filed: Jul. 12, 1991

[30] Foreign Application Priority Data

Aug. 8, 1990 [JP] Japan ................. 2-211416

[51] Int. Cl.$^5$ ................. C07K 15/12; C07K 15/20
[52] U.S. Cl. ................. 530/356; 8/94.27; 8/94.26; 8/94.28; 8/94.29; 8/94.19 R
[58] Field of Search ................. 530/356, 94.19 R; 8/94.26, 94.27, 94.28, 94.29

[56] References Cited

U.S. PATENT DOCUMENTS 4,834,762  5/1989  Nishihori .
5,153,067 10/1992  Yoshida ................. 524/11

FOREIGN PATENT DOCUMENTS 63-80290 11/1991 Australia .
382807  4/1991  Japan .

OTHER PUBLICATIONS

Australian Patent Office Office Action issued on corresponding Australian Patent Application No. 80419/91 dated Nov. 20, 1992.

*Primary Examiner*—Howard E. Schain
*Assistant Examiner*—P. Lynn Touzeau
*Attorney, Agent, or Firm*—Sughrue, Mion, Zinn, Macpeak & Seas

[57] ABSTRACT

A collagen powder is obtained by wet-pulverizing a purified animal tissue consisting mainly of collagen in water at a collagen concentration of 1–30% by weight at a water temperature of not more than 37° C. and a pH value of 2–8, tanning treating the pulverized tissue at a pH level of 2–7 with a polyvalent metal tanning agent to obtain a stabilized wet collagen product, dehydrating the wet collagen product at a pH level of 4–8, and then drying and pulverizing the dehydrated product into a powder. This powder can be used as an additive for modifying paints, artificial leathers, molding materials and the like based on synthetic resins such as thermoplastic resins. The materials obtained with this powder have an excellent appearance, feel, and moisture-absorbing and moisture-releasing properties.

10 Claims, No Drawings

PROCESS FOR PRODUCING COLLAGEN POWDER

BACKGROUND OF THE INVENTION (1) Field of the Invention

The present invention relates to a novel process for producing a collagen powder. More particularly, it is directed to a process for producing a collagen powder suitable for use as an additive available for modifying paints, artificial leathers, molding materials and the like, based on synthetic resins such as thermoplastic resins.

(2) Description of the Related Art

Under the present climate of a demand for high quality goods, paints, artificial leathers, molding materials and the like are required to possess a natural leather-like characteric such as appearance, feel, moisture-absorbing and moisture-releasing properties and moisture permeability, and to meet these requirements, attempts to modify these products to obtain a resemblance thereby to natural leathers have been made by adding collagen powders, leather powders, gelatine powders, polyurethane beads and the like to the base synthetic resins for paints, artificial leathers, and molding materials, including polyurethane resins, polyacrylic resin, polyvinyl chloride resins and the like.

Several processes for producing collagen powders and leather powders have been proposed, and most thereof consist only of pulverizing a chromium- or tannin-tanned hide into powder. These raw materials are tanning-treated in the pelt-state, i.e. in the state of a collagen fiber bundle, and therefore even when pulverized, can only be converted into long fibers but not into a fine powder state. As seen in Japanese Examined Patent Publication (Kokoku) No. 40-11075, for example, artificial leathers produced by adding these materials to a thermoplastic resin have a problem in that the resulting leathers have no surface smoothness and thus do not give a natural-leather like feel, although other problems exist. Recently, to solve these problems, a process wherein leather scraps are thermally treated with steam and then pulverized into powder has been proposed, for example, in Japanese Unexamined Patent Publication (Kokai) No. 63-99298, but although the leather powder is in a granular form, since it is heated to 100° C. or more by steam, the powder has a low hygroscopicity and a large apparent bulk density (JIS K 6712), and therefore, when the powder is used as an additive for a paint, for example, a problem arises in that the surface matting and moisture-absorbing and moisture-releasing, properties and the like are very poor.

Furthermore, a process in which a collagen is pulverized into powder, not using leather scrap, has been proposed in Japanese Examined Patent Publication (Kokoku) No. 61-4419. This process comprises carrying out a coarse dispersion, tanning, dispersion, dehydration, and drying treatments, in sequence, using a purified animal pelt to obtain a collagen powder. Nevertheless, since the collagen fiber bundle obtained from the coarse dispersion is tanning-treated, the collagen is changed into the fabric state, and thus this process has a disadvantage similar to that of the process of Japanese Examined Patent Publication (Kokoku) No. 40-11075.

Furthermore, Japanese Patent Application No. 1-217466 proposed a process for producing a wet collagen by pulverizing in water an animal tissue consisting mainly of collagen purified with a special process, and then tanning with a tanning agent. Nevertheless, since the pulverization of the animal tissue in water is carried out at a low collagen concentration of 0.3 to 0.8% by weight, this process has the disadvantages of requiring a long time for the pulverization, and of an insufficient disintegration of the collagen fiber bundle, and thus is incorporated in the powder in the state of a long fabric substance.

SUMMARY OF THE INVENTION

An object of the present invention is to provide a collagen powder while solving the problems described in the prior art, whereby the collagen powder has a low apparent bulk density, contains no fabric substance, is in the powder form, and when added to base resins for paints, artificial leathers, and molding materials, is capable of imparting thereto properties resembling those of natural leathers.

As a result of an investigation into the problems mentioned above, the following findings were made, whereby the present invention was achieved. Namely by mincing a purified collagen mass obtained by lime soaking, enzyme-treating and washing an animal tissue such as a swine or bovine hide, and then wet-pulverizing same in water at a collagen concentration of 1–30% by weight and a water temperature of not more than 37° C., and at a pH value of 2–8, a collagen fibril-dispersed or—dissolved product is efficiently obtained. Thereafter, a polyvalent metal salt hitherto used as a tanning agent for pelts, such as a chromium, aluminum or zirconyl salt, is added as a tanning agent at a pH level of 2–7, to prepare a stabilized wet collagen product, the pH level is adjusted to 4–8, and the product is dehydrated followed by drying and pulverizing. As a result, the collagen product obtained has a low apparent bulk density and is in the form of a powder, not in the form of a fabric.

DESCRIPTION OF THE PREFERRED EMBODIMENTS

The process for producing a collagen powder of the present invention is based on the theory that, to obtain the above-mentioned collagen powder, it is necessary to tanning-treat the collagen uniformly during the tanning-treatment, to thereby obtain a wet collagen product after the purified collagen mass is minced and then wet-pulverized in water, and to suppress a hydrolysis (gelatinization) of collagen as much as possible. Therefore, the present invention is characterized by a process of thoroughly wet-pulverizing a purified animal tissue consisting mainly of collagen in water at a preferably 3–15% by weight, to prepare a fibril dispersed or dissolved product, and then tanning treating same at a pH level of 2–7 with a tanning agent, under detailed and restricted conditions whereby the pH level of the wet-pulverization is set at 2–8, the temperature is set at not more than 37° C., a polyvalent metal tanning agent is used in the tanning treatment at a pH value of 2–7, and the pH value of the dehydration is adjusted to 4–8.

The present invention will now be explained in detail. Namely, the present invention provides a process for producing a collagen powder by carrying out the dissolution or dispersion of an animal tissue, e.g., a purified animal pelt, in water, tanning, dehydration, drying, and pulverization, in sequence. The animal tissues which can be used include tissues containing a large quantity of collagen, such as hides, skins, kips, bones and tendons of mammals such as bovine, equine, swine, goat, and sheep, and of all other vertebrates. The purification processes are not specifically limited, but include a process using one or more of a protease type enzyme such as papain, pepsin, trypsin or fromelain and/or lipase type enzyme such as pancreatin or steapsin, a process using an alkali such as lime, a process using an ionic- or a non-ionic surfactant and the like. Animal pelts in which impurities have been totally removed by jointly applying the above-mentioned enzyme treatment and the surfactant treatment are preferably used. Also, preferably a non-ionic surfactant is used herein rather than an ionic surfactant, which is apt to remain in the pelt even after washing.

The dispersion or dissolution by wet-pulverization is a treatment whereby the purified collagen mass is swollen by water into a dispersed or a dissolved product of the collagen fibril, to maintain the properties of the collagen and prevent it from pulverizing into a long fiber, and at the same time, making the subsequent tanning treatment easy and uniform.

This treatment is carried out by coarsely mincing the purified animal tissue with a meat grinder and the like, diluting it with water to a collagen concentration of 1-30% by weight, adjusting the pH level to 2-8, and then wet-pulverizing it by using an apparatus such as a paper-manufacturing beater and a rotary blade disintegrator; being careful that the water temperature does not exceed 37° C. A collagen concentration of not more than 1% by weight is not preferable since, under such a condition, the wet-pulverization cannot uniformly be conducted, and thus the residue of fiber bundle parts is markedly increased, and further, the efficiency of the wet-pulverization is greatly lowered. Conversely, a collagen concentration exceeding 30% by weight is not preferable because, due to a heightening of the viscosity of the dispersion, the water temperature rises to 37° C. or more during the wet-pulverization, resulting in a hydrolysis of the collagen, and thus a means for lowering the pulverizing rate and the like is required, which markedly lowers the pulverization efficiency.

By making the pH value at this stage in the range of pH 2-8, the properties of the collagen are decided, and furthermore, the physical properties of the collagen such as the apparent bulk density also are determined. Namely, when the pH is set at a high level within pH 2-8, the collagen is turned into a fabric substance and the apparent bulk density is lowered. When the pH value is set at a low level, the collagen becomes a strongly swollen or dispersed product, and the apparent bulk density is heightened.

In this connection, a pH level of less than 2 or more than 8 is not preferable, because a hydrolysis of the collagen easily occurs. Acids or alkalis used for adjusting the pH value may be those which are generally used, and include mineral acids such as hydrochloric acid and sulfuric acid, and organic acids such as acetic acid, lactic acid, citric acid, tartaric acid, succinic acid, and malic acid for the acids and sodium hydroxide, sodium bicarbonate, aqueous ammonia, and organic amines for the alkalis.

In the tanning-treatment, a tanning agent is added to the dispersed or dissolved product of the collagen fiber to be deposited between the fibers or molecules or to be bonded between the fibers or molecules, to maintain the water absorption of the collagen powder at a constant level and enhance the thermal resistance. As the determination of the water absorption has not been standardized, it is determined in the following manner. About 1 g of powdery sample ($W_A$) is immersed in water for a period of 1 hour or more, to absorb the water in the sample, and the sample is then thoroughly drained and placed in the form of a circle having a diameter of 4 cm on a filter paper (Filter Paper No. 5C supplied by Toyo Roshi; 9 cm). Several filter papers are laminated above and below the sample, a weight of 20 kg is placed on the stack, and a dehydration under compression is carried out for 3 minutes to remove excess water adhering thereto. The weight ($W_B$) of the sample is then measured, and the water absorption is calculated according to the following formula:

Water Absorption (% by weight) = $(W_B - W_A)/W_A \times 100$

As the tanning agents, polyvalent metal compounds such as chromium, zirconyl and aluminum salts can be mentioned. Further, in addition to such a tanning agent, organic tanning agents such as formaldehyde, glutaraldehyde, and tannin may be jointly used. When the polyvalent tanning agent is used as the main tanning agent, it is possible to considerably increase the thermal deformation temperature of the collagen, and a high temperature can be applied at the post-stages of dehydration and drying, and thus these stages can be performed efficiently. Furthermore, by varying the amount of the tanning agent to be added, it is possible to vary the water-absorption of the collagen powder.

For example, the required amount of the tanning agent added for adjusting the water-absorption to 150-300% by weight, which is preferred for the additives for paints and artificial leathers and molding materials, is 1-2 parts by weight for chromium sulfate, 1-10 parts by weight for zirconyl sulfate, and 2-20 parts by weight for aluminum sulfate, per 100 parts by weight of the collagen, respectively. If the appearance of the collagen should be white, a zirconyl or aluminum salt is preferably used.

Furthermore, the collagen dispersion is tanning-treated at a pH value of 2-7. If the pH value is less than 2, it is difficult to deposit the metal tanning agent between the collagen fibers, or the carboxyl groups in the collagen are not dissociated, and thus the bonding to the tanning agent is very slow. If the pH value is over 7, the polyvalent metallic ions in the tanning agent are precipitated out as a hydrate as soon as added, even in the presence of organic acid ions such as acetic acid, citric acid, and lactic acid ions, and thus the tanning cannot be carried out uniformly. It is also possible to obtain a collagen powder pigmented or having a different hardness by the addition of a pigment such as iron oxide, zinc oxide, satin white, barium sulfate, white lead, red lead, chrome yellow, vermilion, ultramarine blue, iron blue, cobalt oxide, strontium chromate, zinc chromate, molybdenum red, molybdenum white, litharge, and titanium dioxide or an extender pigment such as kaolin, talc, calcium carbonate, and silica, at the tanning step.

The dehydration treatment is carried out using a usual centrifuger, filter press or screw press, to reduce the water content of the collagen mass obtained by tanning treatment and facilitate the drying. In this case, the dehydration is carried out by adjusting the pH value to 4-8, because if the pH is less than 4 or more than 8, a hydrolysis of the collagen occurs, or the resulting collagen powder becomes acidic or alkaline, and thus when mixed with a synthetic resin, a hydrolysis of the resin occurs, which impairs the physical properties of the article.

The temperature of the collagen during dehydration is not specifically limited, but is preferably 70° C. or more, as this will cause an aggregation of the wet collagen to thereby release part of the water held by the collagen, and thus increase the efficiency of the dehydration. Nevertheless, a heating to a temperature of not less than the thermal deformation temperature, which depends upon the type and amount of the tanning agent used, must be avoided, because a hydrolysis of the collagen will occur.

The drying treatment is carried out in the usual manner using a dryer such as a fluidized type, tray type, belt type, paddle type or spray type dryer, to further reduce the water content of the wet collagen which has been made a mass by reducing the water content in the dehydration treatment. Preferably is the pulverization treatment carried out when the water content of the dried collagen is not more than 10% by weight.

The pulverization treatment is used to adjust the particle size of the collagen mass obtained in the dehydration treatment, to a size suitable for practical use in paints, artificial leathers, and molding materials, using a usual jet mill, hammer mill, and ball mill. The properties of the powder formed depend upon the objects of use, but preferably the particle size has an approximately normal distribution, the average particle size ranges from 4-25 $\mu$m, and the content of the particles of a particle size of not more than 40 $\mu$m is 85% or more. The particle size and the particle size distribution are determined by the Coulter Counter method.

Different from the leather powder obtained only by pulverizing a leather produced by tanning-treating a purified pelt, the composition of the collagen powder thus produced is such that, after the collagen fiber bundle is once completely disintegrated or dissolved by the wet-pulverization in water, it is aggregated by a tanning treatment, and thus the powder becomes a coarsely and densely packed complex structure having many gaps, and is characterized by having a high water absorption and a low apparent bulk density.

Under the above-mentioned conditions, where the wet pulverization and the tanning treatment are carried out when the collagen is precipitated, a collagen powder having an especially high oil absorption (JIS K 5101) is obtained. If the oil absorption is low, a problem arises of poor dispersibility when the powder is added to a synthetic resin, etc., to be used in paint, artificial leathers, molding materials, etc. The collagen powder is precipitated out in the resin or the solution thereof due to the difference between the true density of the collagen and the density of the resin solution to be solidified into a cake, and thus it is impossible to re-disperse same. Consequently, a low oil absorption is not preferred, and a collagen having a high oil absorption is preferred from the above-viewpoint.

The state wherein the collagen is precipitated is either that where the collagen is neither dissolved nor swelled in water, but is precipitated in the fabric form, or where it is made into a slurry. The form of the precipitation may be either as a regular assembly or an amorphous assembly. Further, the collagen is precipitated out by adjusting the pH level to not lower than the isoelectric point of the collagen or by salting out the collagen with a salt such as sodium chloride, ammonium sulfate, potassium phosphate, sodium citrate or sodium sulfate. These two methods also may be jointly used.

The term "isoelectric point" used herein means the pH value at which +(plus) electric charges and −(minus) electric charges are cancelled and the collagen apparently has no electric charge. Concerning the collagen, depending upon the purification processes, where an animal pelt is treated with an alkali to be purified, a pH of 4-5 is the isoelectric point pH as a rule.

The collagen powder produced by the process of the present invention is advantageously used by mixing with paints, artificial leathers, and molding materials based on the synthetic resin such as polyurethane resins, polyester resins, polyacrylic resins, and polyvinyl chloride resins. Paints, artificial leathers, and molding materials having a natural leather like appearance and feel, as well as absorbing and releasing moisture, can be obtained respectively.

For example, typically, the paint is prepared by incorporating and thoroughly dispersing the collagen powder in a polyurethane resin as a binder in an amount of 30 to 200 parts by weight per 100 parts of the solid of the paint, and optionally, adding a solvent to adjust the concentration to an appropriate level. The paint thus formed is coated by a spray gun or a coater. In a typical artificial leather, the collagen powder is incorporated into a polyurethane resin in an amount of 30 to 200 parts by weight per 100 parts of the polyurethane resin, and the mixture is kneaded and bonded to a polyvinyl chloride sheet or a non-woven fabric sheet. In a typical molding material, as in the artificial leather, the collagen powder is incorporated into a polyurethane resin in an amount of 30 to 200 parts by weight per 100 parts by weight of the polyurethane resin, and the mixture is kneaded and molded by an extruder or the like. In each case, an excellent appearance, feel, and moisture-absorbing and moisture-releasing properties similar to those of the natural leathers are attained.

According to the present invention, a collagen powder can be obtained, and using this collagen powder, materials having a good appearance, feel, and moisture-absorbing and moisture-releasing properties can be obtained by application to paints, artificial leathers and molding materials.

The present invention will now be described in detail with reference to the following examples.

EXAMPLE 1

1) Purification and Wet-Pulverization Treatments

A bovine bare hide was alkali-treated with lime and then washed with water, and 500 parts by weight (the dry amount was 100 parts by weight; parts by weight will be abbreviated to parts hereinafter) of the treated hide was immersed in a treating liquid having the composition shown below, the pH value of which was adjusted to 8.1 with sodium bicarbonate.

| | |
|---|---|
| Papain | 0.60 part |
| Pancreatin | 0.15 part |
| L-Glutamic acid | 0.35 part |
| Sodium chondroitin sulfate | 0.003 part |
| Potassium hydrogen-L-tartrate | 0.35 part |
| Triton X-100* | 0.50 part |
| Water | 5000 parts |

*Non-ionic surfactant (Trade name of polyoxyethylene-alkylphenyl ether)

Using a household washing machine, impurities were removed by stirring at room temperature for 12 hours, and after being washed with water, a lactic acid was added to adjust the pH value to 3.5. The purified collagen texture was minced by a meat grinder, then diluted with the concentration of the dry weight of the original hide was 3.5% (pH 4.0), and the wet-pulverization was carried out at a water temperature of 25° C. using a paper-manufacturing beater.

2) Tanning Treatment

After the wet-pulverization treatment in the paper-manufacturing beater (pH 3.8), the following tanning agents were added in sequence, and the tanning treatment was carried out to obtain a stabilized wet collagen product.

| Basic aluminum sulfate | 4.5 parts |
| Zirconyl sulfate | 2.5 parts |

3) Dehydration, Drying, and Pulverization Treatments

After the pH value of the wet collagen product obtained by the tanning treatment was adjusted to 6.0 with sodium bicarbonate, the product was dehydrated by a screw press dehydrator so that the water content was reduced to 67% by weight, and then dried by a hot-air tray type drier to reduce the water content to 9.5% by weight, and then further pulverized by a ball mill into a collagen powder having the physical properties shown in Table 1.

EXAMPLE 2

1) Purification and Wet-Pulverization Treatments

A bovine bare hide was alkali-treated with lime and then washed with water, and 500 parts by weight (the dry amount was 100 parts by weight) of the treated hide was immersed in a treating liquid having the composition shown below, the pH value of which was adjusted to 9.0 with ammonium sulfate.

| Papain | 0.55 part |
| Pancreatin | 0.15 part |
| Potassium hydrogen-L-tartrate | 0.30 part |
| Triton X-100 | 0.50 part |
| Water | 5000 parts |

Using a household washing machine, impurities were removed by stirring at room temperature for 12 hours, and after being washed with water, a lactic acid was added to adjusted the pH value to 4.0. The purified collagen texture was minced by a meat grinder, then diluted with water so that the concentration of the dry weight of the original hide was 6.0%, the pH value was further adjusted to 3.2 with lactic acid, and then the wet-pulverization was carried out at a water temperature of 30° C. using a rotary blade disintegrator.

2) Tanning Treatment

After the wet-pulverization treatment in a household mixer (pH 3.0), the following tanning agents were added in sequence and the tanning treatment was carried out to obtain a stabilized wet collagen product.

| Basic aluminum sulfate | 2.5 parts |
| Zirconyl sulfate | 3.0 parts |

3) Dehydration, Drying, and Pulverization Treatments

After the pH value of the wet collagen product obtained by the tanning treatment was adjusted to 7.0 with sodium hydroxide, the product was heated to 70° C., dehydrated by a centrifugal dehydrator so that the water content was reduced to 65% by weight, dried by a fluidized type dryer to reduce the water content to 5.0% by weight, and then further pulverized by a jet mill into a collagen powder having the physical properties shown in Table 1.

EXAMPLE 3

Wet-Pulverization and Tanning Treatments when the Collagen is Precipitated

1) Purification and Wet-Pulverization Treatments

A bovine bare hide was alkali-treated with lime and then washed with water, and 500 parts by weight (the dry amount was 100 parts by weight) of the treated hide was immersed in a treating liquid having the composition shown below, the pH value of which was adjusted to 8.1 with sodium bicarbonate.

| Papain | 0.60 part |
| Pancreatin | 0.15 part |
| L-Glutamic acid | 0.35 part |
| Sodium chondroitin sulfate | 0.003 part |
| Potassium hydrogen-L-tartrate | 0.35 part |
| Triton X-100 | 0.50 part |
| Water | 5000 parts |

Using a household washing machine, impurities were removed by stirring at room temperature for 12 hours, and after being washed with water, a lactic acid was added to adjust the pH value to 4.0. The purified collagen texture was minced by a meat grinder, diluted with water so that the concentration of the dry weight of the original hide was 12.5%, the pH value was adjusted to 7.3 with sodium bicarbonate to precipitate out the collagen, and then the wet-pulverization was carried out at a water temperature of 20° C. using a paper-manufacturing beater.

2) Tanning Treatment

After the wet-pulverization treatment in a household mixer (pH 6.7), the following tanning agents were added in sequence when the collagen was precipitated and the tanning treatment was carried out to obtain a stabilized wet collagen product.

| Basic aluminum sulfate | 4.5 parts |
| Zirconyl sulfate | 2.5 parts |

3) Dehydration, Drying and Pulverization Treatments

The wet collagen product obtained by the tanning treatment was dehydrated at a pH value of 5.3 by a screw press dehydrator so that the water content was reduced to 69% by weight, then dried by a hot-air tray type drier to reduce the water content to 1.2% by weight, and further pulverized by a hammer mill into a collagen powder having the physical properties shown in Table 1.

COMPARATIVE EXAMPLE 1

Process Where the Wet-Pulverization is Carried out at a Low Collagen Concentration 1) Purification and Wet-pulverization Treatments The purification and the wet-pulverization were carried out as in Example 1, except that the concentration during the wet-pulverization was changed to 0.7% by weight.

2) Tanning Treatment

After the wet-pulverization, the tanning treatment was carried out as in Example 1 to obtain a stabilized wet collagen product.

3) Dehydration, Drying, and Pulverization Treatments

After the pH value of the wet collagen product obtained by the tanning treatment was adjusted to 6.3 with sodium hydroxide, the product was dehydrated by a screw press dehydrator so that the water content was reduced to 72% by weight, dried by a hot-air tray type drier to reduce the water content to 9.0% by weight, and then further pulverized by a hammer mill into a collagen powder having the physical properties shown in Table 1.

COMPARATIVE EXAMPLE 2

Process Wherein a Leather Scrap is Pulverized

A general chromium-tanned leather scrap was minced and then heated to 110° C. for 3 hours to be swelled in an autoclave by heated steam, followed by drying and pulverizing as in Example 1, to obtain a leather powder having the physical properties as shown in Table 1.

COMPARATIVE EXAMPLE 3

Process Wherein a Dispersed Product of Fiber Bundle is Treated with an Organic Tanning Agent 1) Purification and Coarse Dispersion Treatments A bovine bare hide was alkali-treated with lime and then washed with water, and 500 parts by weight (the dry amount was 100 parts by weight) of the treated hide was immersed in a treating liquid having the composition shown below, the pH value of which was adjusted to 9.0 with ammonium sulfate.

| | |
|---|---|
| Papain | 0.55 part |
| Pancreatin | 0.15 part |
| Potassium hydrogen-L-tartrate | 0.30 part |
| Triton X-100 | 0.50 part |
| Water | 5000 parts |

Using a household washing machine, impurities were removed by stirring at room temperature for 12 hours, and after being washed with water, a lactic acid was added to adjusted the pH value to 5.0. The purified collagen texture was minced by a meat grinder, further coarsely dispersed by a disperse mill, then diluted with an aqueous 15% by weight of sodium sulfate so that the concentration of the dry weight of the original hide was 4.0%, and the pH value was adjusted to 8.5 with sodium carbonate.

2) Tanning Treatment

To the coarsely dispersed collagen fiber bundle was added 0.5 g of glutaraldehyde, and then the tanning treatment was carried out for 5 hours. After being washed with water, the whole amount was changed to 5000 parts (2.0% as the concentration of the dispersed substance).

3) Dispersion Treatment

After adjusting the pH value to 5.0 with hydrochloric acid, the tanning-treated dispersed product was re-dispersed by a disperse mill to obtain a collagen fiber-dispersed product.

4) Dehydration, Drying, and Pulverization Treatments

The collagen dispersed product obtained by the re-dispersion was dehydrated by a screw press dehydrator so that the water content was reduced to 69% by weight, dried by a hot-air tray type drier to reduce the water content to 9.5% by weight, and then further pulverized by a hammer mill into a collagen powder having the physical properties shown in Table 1.

Applied Tests

The collagen powders or the leather powder obtained in Examples 1, 2, and 3, and Comparative Examples 2 and 3, respectively were applied to A) paints, B) artificial leathers, and C) molding materials as described herein below, and the items shown in Table 1 were tested to obtain the results as shown in Table 1. The powder obtained in Comparative Example 1, however, could not be subjected to these applications because of a high rate of long fabric substances therein.

A. Paints

To a resin solution of 100 parts of a polyurethane in 200 parts of ethyl acetate was added 50 parts of each collagen powder, and the powder was thoroughly dispersed in the solution to form a clear paint. The paint was coated on the surface of a transparent polycarbonate plate by using a spray gun, so that the dry thickness of the coating was 50 μm, and then dried.

B. Artificial Leathers

To a resin solution of 100 parts of a polyurethane in 200 parts of ethyl acetate were added 50 parts of each collagen powder and 8 parts of carbon black, which were thoroughly dispersed in the solution to obtain a surface-treating agent. The agent was coated on the surface of a release paper by using a gravure coater, so that the dry thickness of the coating was 30 μm. The coating was dried and an adhesive layer was formed on the surface of the coating, and the coating was bonded to a non-woven fabric sheet to obtain an artificial leather.

C. Molding Materials

To 100 parts of a foamable polyurethane resin were added 50 parts of each collagen powder and 8 parts of carbon black, and the mixture was kneaded and then melt-molded into a sheet by a melt-molding machine to obtain a molded sheet.

TABLE 1

Physical Properties of Powders and Evaluation of Application Tests

| | Physical Properties of Powders | | | | | Test Items | | | |
|---|---|---|---|---|---|---|---|---|---|
| | Content (wt %) at particles having particle diameter smaller than 40 μm | Medium diameter (μm) | Water-Adsorption[1] (wt %) | Apparent bulk density (g/ml) | Oil Adsorption (ml/g) | Application Test Samples | Hue | Feel[2] | Moisture-absorbing and releasing properties | |
| | | | | | | | | | Moisture Absorption[3] | Moisture Releasing property[4] |
| Example 1 | 89.7 | 21.0 | 155 | 0.26 | 0.53 | A | Colorless Transparent | o | 3.18 | 19.0 |
| | | | | | | B | Black | o | 3.42 | 22.3 |
| | | | | | | C | Black | o | 3.63 | 23.0 |
| Example 2 | 97.5 | 7.6 | 170 | 0.21 | 0.65 | A | Colorless Transparent | o | 3.01 | 18.6 |
| | | | | | | B | Black | o | 3.22 | 21.9 |
| | | | | | | C | Black | o | 3.37 | 22.5 |
| Example 3 | 85.7 | 23.5 | 148 | 0.16 | 1.48 | A | Colorless Transparent | o | 2.95 | 18.3 |
| | | | | | | B | Black | o | 3.15 | 21.2 |
| | | | | | | C | Black | o | 3.28 | 21.9 |
| Comparative Example 1 | 56.0 | 38.6 | 150 | 0.22 | 0.69 | — | — | — | — | — |
| | | | | | | — | — | — | — | — |
| Comparative Example 2 | 93.8 | 10.8 | 100 | 0.47 | 0.55 | A | Pale Green | o | 1.59 | 11.2 |
| | | | | | | B | Black | o | 1.75 | 11.6 |
| | | | | | | C | Black | o | 1.83 | 12.4 |
| Comparative Example 3 | 65.3 | 30.6 | 137 | 0.08 | 0.33 | A | Colorless Transparent | x | 2.45 | 13.3 |
| | | | | | | B | Black | x | 2.66 | 13.7 |
| | | | | | | C | Black | x | 2.79 | 14.5 |

Note

1) About 1 g of powdery sample ($W_A$) was immersed in water for 1 hour or more to absorb the water in the sample, and the sample was then thoroughly drained and placed in the form of a circle having a diameter of 4 cm on a filter paper (Filter Paper No. 5C supplied by Toyo Roshi; 9 cm). Several filter papers were laminated above and below the sample, a weight of 20 kg was placed on the assembly, and a dehydration under compression is carried out for 3 minutes to remove excess water adhering thereto. The weight ($W_B$) of the sample was then measured, and the water absorption calculated according to the following formula:

Water Absorption (% by weight) = $(W_B - W_A)/W_A \times 100$

2) The feel was evaluated based on the feeling obtained when the surface layer was touched by the hand.

good: ⊚ > ○ > △ > ×: bad

3) According to JIS P-8140 (unit:g/m²). A larger value is preferable. The practical necessary level is 2.50.

4) After the measurement of the water-absorbing property under 3), the weight (mg) of the absorbed water evaporated for 1 second from 1 m² of the surface layer at a temperature of 20° C. and a relative humidity of 60% was measured as the water-releasing property. A larger value is preferable. The practical necessary level is 15.0.

It can be seen from the results of Table 1 that the collagen powder produced according to the present invention had higher modification properties with regard to appearance, feeling, and moisture-absorbing and moisture-releasing properties, etc., in comparison with those in use in the substrate. Furthermore, the clear paint obtained with the collagen powder of Example 3 had a superior dispersing property compared to the other paints.

We claim:

1. A process for producing a collagen powder comprising wet-pulverizing a purified animal tissue consisting mainly of collagen in water at a collagen concentration of 1-30% by weight and at a water temperature of not more than 37° C., at a pH value of 2-8, tanning treating the pulverized tissue at a pH level of 2-7 with a polyvalent metal tanning agent to obtain a stabilized wet collagen product, dehydrating the wet collagen product at a pH level of 4-8, and then drying and pulverizing the dehydrated product into a collagen powder.

2. A process according to claim 1, wherein the collagen concentration at the wet-pulverization is 3-15% by weight.

3. A process according to claim 1, wherein the pH value at the wet-pulverization is adjusted by using lactic acid or sodium bicarbonate.

4. A process according to claim 1, wherein the polyvalent metal tanning agent is selected from chromium, zirconyl and aluminum salts.

5. A process according to claim 1, wherein an organic tanning agent is used together with the polyvalent metal tanning agent.

6. A process according to claim 1, wherein the dehydration is carried out after heating the collagen product to about 70° C. or higher.

7. A process according to claim 1, wherein the dehydrated collagen is dried to a water content of not more than 10% by weight at the drying step.

8. A process according to claim 1, wherein the resulting powder has an average particle size of 4–25 μm and not less than 85% of the particles have a particle size of not more than 40μm.

9. A process according to claim 1, wherein the wet-pulverization and the tanning treatment are carried out under the condition that the collagen is precipitated by adjusting the pH of the mixture to not lower than the isoelectric point of the collagen or by salting out the collagen.

10. A process according to claim 1, wherein a pigment or extender pigment is added at the tanning step.

* * * * *